United States Patent [19]
Jen

[11] Patent Number: 5,170,457
[45] Date of Patent: Dec. 8, 1992

[54] OPTICAL FIBERS WITH PRESET STIMULATED BACKWARD BRILLOUIN SCATTERING THRESHOLDS

[76] Inventor: Cheng-Kuei Jen, 8295 Pelletier, Brossard, Quebec, Canada, J4X 1P6

[21] Appl. No.: 774,872

[22] Filed: Oct. 11, 1991

[51] Int. Cl.$^5$ .......................... G02B 6/00; G02B 6/36
[52] U.S. Cl. .................................................. 385/123
[58] Field of Search ............................ 385/123–126, 385/141

[56] References Cited

PUBLICATIONS

R. G. Smith, Applied Optics, vol. 11, No. 11, pp. 2489–2494, 1972.
D. Cotter, Journal of Optical Communications, vol. 4, No. 1, pp. 10–19, 1983.
J. Kushibiki et al., IEEE Trans. Sonics and Ultrason., vol. SU-32, No. 2, pp. 189–212, 1985.
A. Atalar, J. Appl. Phys., vol. 49, No. 10, pp. 5130–5139, 1978.

Primary Examiner—Akm E. Ullah
Attorney, Agent, or Firm—Swabey Ogilvy Renault

[57] ABSTRACT

Optical fibers comprising a core region surrounding by a cladding region, and having a high stimulated backward Brillouin scattering threshold, $P_{TH}$, for telecommunication transmission line application, or a low $P_{TH}$ for distributor sensor application are disclosed. By controlling the longitudinal and shear acoustic wave velocity profiles of an optical fiber such that $V_{L,core} > 1.03\ V_{L,cladding}$ and $V_{S,core} > 1.03\ V_{S,cladding}$, where $V_{L,core}$ and $V_{S,core}$ are respectively the longitudinal and shear acoustic wave velocities of the core region, and $V_{S,core}$ and $V_{S,cladding}$ the longitudinal and shear acoustic wave velocities of the cladding region, the optical fiber will have a $P_{TH}$ higher than 20 milliwatts. For low $P_{TH}$ optical fibers, that is, with a $P_{TH}$ lower than 1 milliwatt, the longitudinal and shear acoustic wave velocity profiles of the fiber must be such that $V_{L,core} < 0.97\ V_{L,cladding}$ and $V_{S,core} < 0.97\ V_{S,cladding}$. In both high and low $P_{TH}$ optical fibers, the refractive index of the core region is higher than that of the cladding region for optical wave guidance.

20 Claims, 11 Drawing Sheets

OPTICAL FIBERS WITH PRESET STIMULATED BACKWARD BRILLOUIN SCATTERING THRESHOLDS

BACKGROUND OF THE INVENTION

The present invention relates to improvements in the field of optical waveguides. More particularly, the invention is concerned with an improved optical fiber having a preset stimulated backward Brillouin scattering threshold for high power transmission application as well as for distributed sensor application.

The attractiveness of coherent optical fiber transmission systems are their long repeater spacing and large transmission capacity. To utilize the available bandwidth and to increase the system margins, narrow optical spectra and high transmitter powers are required. However, these two requirements are limited by optical nonlinear effects such as stimulated backward Brillouin scattering (hereinafter referred to as SBBS). If the optical power launched into a conventional telecommunication type optical fiber exceeds some critical threshold level $P_{TH}$, SBBS will occur. In this process, a significant portion of the optical power travelling through the fiber is reflected and converted into a second light wave, shifted in frequency, travelling backward towards the transmitter, and the power level of the transmitted light cannot be increased above a limit.

As reported by R. G. Smith in Applied Optics, Vol. 11, No. 11, pp. 2489-2494, 1972, SBBS not only limits the maximum transmittable optical power, but also disturbs the optical spectra in low-loss long-distance single mode optical fibers. D. Cotter in Journal of Optical Communications, Vol. 4, No. 1, pp. 10-19, 1983, has also observed that the threshold power level $P_{TH}$ for conventional optical fibers is about 5 milliwatts. It is thus necessary to operate at input power levels below the threshold of SBBS, and this places a severe limitation on the launch power as well as on the repeater spacing.

The 5 milliwatts threshold power level is at least ten times less than the desired level for telecommunication applications. This gives rises to problems in practical long distance optical fiber transmission applications when the input laser power is increased especially with a monochromatic light source. For this telecommunication transmission line application, optical fibers with high $P_{TH}$ are therefore desired.

However, in the distributed sensor application, the power reflected back to the input end owing to SBBS can be used as a sensing signal for the sensors which are distributed along the length of the optical fiber. For instance, the reflected optical light has a frequency shift which is proportional to the localized acoustic velocity at a specific location along the optical fiber. If there exists a local strain which induces a local stress and thus changes the acoustic velocity, then the frequency of the reflected light will be shifted due to SBBS. Since the frequency shift can be continuously detected, the strain distribution along an optical fiber installation can be monitored. For this distributed sensor application, optical fibers with low $P_{TH}$ are therefore desired.

For telecommunication transmission line applications, some solutions have been suggested primarily by circumventing the problem, e.g. broadening the spectral line width and distributing the light power over a spectral range. However, no solution has been suggested to increase the $P_{TH}$ simply because the SBBS phenomena in optical fibers have not been fully understood. Similarly, for the optical fiber distributed sensor application, no effort has been made to reduce the $P_{TH}$.

SUMMARY OF THE INVENTION

It is therefore an object of the present invention to overcome the above drawbacks and to adjustably set the $P_{TH}$ level in an optical fiber.

It is another object of the invention to increase the $P_{TH}$ in an optical fiber for telecommunication transmission line applications or to reduce the $P_{TH}$ for distributed sensor applications.

It is a further object of the invention to provide an optical fiber with preset high or low $P_{TH}$.

According to one aspect of the invention, there is thus provided an optical fiber having a high stimulated backward Brillouin scattering threshold, comprising a core region and a cladding region surrounding the core region, the core and cladding regions being composed respectively of core and cladding regions have respective refractive indices and respective longitudinal and shear acoustic wave velocities satisfying the following relations:

$$n_{core} > n_{cladding}$$

$$V_{L,core} > 1.03\, V_{L,cladding}$$

$$V_{S,core} > 1.03\, V_{S,cladding}$$

where $n_{core}$, $V_{L,core}$ and $V_{S,core}$ are respectively the refractive index, longitudinal and shear acoustic wave velocities of the core region, and $n_{cladding}$, $V_{L,cladding}$ and $V_{S,cladding}$ are respectively the refractive index, longitudinal and shear acoustic wave of the cladding region, the core material having an acoustic material loss higher than 12 dB/cm.GH$_2{}^2$.

According to another aspect of the invention, there is also provided an optical fiber having a low stimulated backward Brillouin scattering threshold, comprising a core region and a cladding region surrounding the core region, the core and cladding regions being composed respectively of core and cladding materials which are selected such that the core and cladding regions have respective refractive indices and respective longitudinal and shear acoustic wave velocities satisfying the following relations:

$$n_{core} > n_{cladding}$$

$$V_{L,core} < 0.97\, V_{L,cladding}$$

$$V_{S,core} < 0.97\, V_{S,cladding}$$

where $n_{core}$, $V_{L,core}$ and $V_{S,core}$ are respectively the refractive index, longitudinal and shear acoustic wave velocities of the core region, and $n_{cladding}$, $V_{L,cladding}$ and $V_{S,cladding}$ are respectively the refractive index, longitudinal and shear acoustic wave of the cladding region, the core material having an acoustic material loss less than 12 dB/cm.GH$_z{}^2$.

Applicant has found quite unexpectedly that the acoustic profile of an optical fiber is closely related to the threshold of SBBS and can thus be used to specifically adjust the threshold. SBBS being a colinear acousto-optic interaction phenomenon, if the acoustic wave loss is high, the efficiency of acousto-optic interaction will be low, thus resulting in a low SBBS. A weaker SBBS means a high $P_{TH}$ for an optical fiber. Conversely, if the acoustic wave loss is low, the efficiency of acousto-optic interaction will be high, resulting in a high SBBS. A stronger SBBS means a low $P_{TH}$.

By the expressions "high $P_{TH}$" and "low $P_{TH}$" are meant stimulated backward Brillouin scattering thresholds higher than 20 milliwatts or lower than 1 milliwatt, respectively. Applicant has found that by controlling the longitudinal and shear acoustic wave velocity profiles of an optical fiber such that $V_{L,core} > 1.03\ V_{L,cladding}$ and $V_{S,core} > 1.03\ V_{S,cladding}$, the optical fiber will have a $P_{TH}$ higher than 20 milliwatts. For low $P_{TH}$ optical fibers, i.e. $_{TH}$ lower than 1 milliwatt, the longitudinal and shear acoustic wave velocity profiles of the fiber must be such that $V_{L,core} < 0.97\ V_{L,cladding}$ and $V_{S,core} < 0.97\ V_{S,cladding}$. On the other hand, in both high and low $P_{TH}$ optical fibers, the refractive index of the core region must be higher than that of the cladding region to ensure optical wave guidance.

The acoustic loss in an optical fiber can be categorized into two main components. One is the waveguide loss and another consists of material losses such as absorption and scattering. The waveguide loss principally depends on the guidance conditions. For instance, if the acoustic wave velocity of the core is higher than that of the cladding, the acoustic wave energy will leak from the fiber core to the fiber cladding. This means that the level of the SBBS in the optical fiber in which the acoustic waves are not guided in the core will be low. If the acoustic wave velocity of the core is less than that of the cladding, the acoustic waves are well guided in the fiber core. The level of the SBBS will thus be high and the $P_{TH}$ low.

The process of stimulated backward Brillouin scattering can be described as a parametric interaction among the pump wave, the Stokes wave, and an acoustic wave (or phonon). The pump wave generates acoustic waves through the process of electrostriction which in turn causes a periodic modulation of the refractive index. The pump-induced index grating scatters the pump light through Bragg diffraction. The scattered light is downshifted in frequency because of the Doppler shift associated with a grating moving at the acoustic velocity $V_a$. Since both the energy and the momentum must be conserved during each scattering event, the frequencies and the wave vectors of the three waves are related by $f_a = f_p = f_s$ and $\vec{k}_a = \vec{k}_p - \vec{k}_s$, where $f_p$ and $f_s$ are the frequencies and $\vec{k}_p$ and $\vec{k}_s$ are the wave vectors of the pump and Stokes waves, respectively. The frequencies shift $f_B$ of the SBBS is given by $$f_B = \frac{2nV_a}{\lambda_p},$$

where $|\vec{k}_p| = 2\pi n/\lambda_p$, n is the refractive index and $\lambda_p$ is the pump wavelength.

For continuous wave laser operation, the threshold, $P_{TH}$, of SBBS can be expressed as:

$$P_{TH} = 21 \left( \frac{\gamma A_{eff}}{g_B L_{eff}} \right) \left( \frac{\Delta v_B + \Delta v_l}{\Delta v_B} \right) \quad (1)$$

where $g_B$ is the Brillouin gain coefficient, $\gamma$ is the polarization factor ($\gamma = 2$ is the polarization is completely scrambled), $\Delta v_B$ and $\Delta v_l$ are intrinsic Brillouin linewidth and laser linewidth, respectively and $A_{eff}$ is the effective area for the $HE_{11}$ mode. If Lorentzian profiles are assumed for the Brillouin and laser spectral-shapes, then $A_{eff} = 2\pi W^2$, where W is the mode field radius. In equation (1) $L_{eff}$ is given as:

$$L_{eff} = \frac{[1 - \exp(-\alpha L)]}{\alpha} \quad (2)$$

where $\alpha$ is the optical attenuation coefficient for both pump and Stokes waves and L is the actual fiber length.

Equation (1) shows that $P_{TH}$ is related to the Brillouin gain coefficient $g_B(f)$ whose peak value occurs at $f = f_B$. At $f = f_B$, one has:

$$g_B(f_B) = \frac{2\pi n^7 p_{12}^2}{c\rho v_a \lambda_p^2 \Delta f_B} \quad (3)$$

where n is the refractive index, $p_{12}$ is the longitudinal photo-elastic coefficient, $\rho$ is the material density, $V_a$ is the acoustic wave velocity and $\lambda$ is the pump wavelength. The spectral width, $\Delta f_B$, is related to the damping time of acoustic waves of the phonon lifetime $T_B$. If the acoustic waves are assumed to decay as $\exp(-t/T_B)$, the spectral width can be expressed as $$\Delta f_B = \frac{1}{\pi T_B}.$$

It is apparent from equations (3), (1) and $\Delta f_B$ that if two optical fibers have the same optical properties, the one having higher acoustic loss (smaller $T_B$, larger $\Delta f_B$, thus smaller $g_B$) will have higher threshold $P_{TH}$. Again, the acoustic losses consist of waveguide and material losses. Optical fibers having $V_{a,core} > V_{a,cladding}$ suffer more waveguide loss than those having $V_{a,core} < V_{a,cladding}$. Optical fibers having doped silica core also suffer higher material loss than those having pure silica core.

There exist both longitudinal and shear acoustic waves in silica glasses, but Applicant has found that the longitudinal wave is mainly responsible for the SBBS in silica optical fibers. Applicant has also found that (i) dopants such as $GeO_2$, F, $B_2O_3$, $P_2O_5$ and $TiO_2$ in silica decrease the acoustic velocity, (ii) $Al_2O_3$ dopant increases the acoustic velocity, (iii) a higher dopant concentration causes a larger change in the acoustic velocity, and (iv) the acoustic velocity is more sensitive than the optical refractive index to the dopant concentration. The acoustic wave velocity difference between the core and cladding regions of an optical fiber according to the invention is preferably larger than 10%.

Since the acoustic energy transfer from the fiber core to the cladding also involves material density, the best transfer is achieved when the product of the material density and the acoustic wave velocity is nearly the same for the core and cladding regions. In other words, for a high acoustic waveguide loss, i.e. high $P_{TH}$ optical fiber, the core and cladding materials are preferably selected such that the core and cladding regions have respective material densities satisfying the following relations:

$$\rho_{core} \cdot V_{L,core} \approx \rho_{cladding} \cdot V_{L,cladding}$$

$$\rho_{core} \cdot V_{S,core} \approx \rho_{cladding} \cdot V_{S,cladding}$$

where $\rho_{core}$ and $\rho_{cladding}$ are respectively the material densities of the core and cladding regions.

For material losses, Applicant has also found that dopants such as $GeO_2$, F, $B_2O_3$, $P_2O_5$, $TiO_2$ and $Al_2O_3$ doped silica have higher material loss than that of pure silica. A higher dopant concentration induces a larger material loss. For high $P_{TH}$ optical fibers, the acoustic material loss of the core material should be higher than 12 dB/cm.$GH_Z^2$ and, for low $P_{TH}$ optical fibers, less than 12 dB/cm.$GH_Z^2$.

The high $P_{TH}$ optical fibers according to the invention can be used for both single- and multi-mode transmissions. The $P_{TH}$ of the optical fibers of the invention is at least four times higher and lower than that of existing optical fibers, respectively.

BRIEF DESCRIPTION OF THE DRAWINGS

Further features and advantages of the invention will become more readily apparent from the following description of preferred embodiments, reference being made to the accompanying drawings, in which.

DESCRIPTION OF PREFERRED EMBODIMENTS

Figure 1:
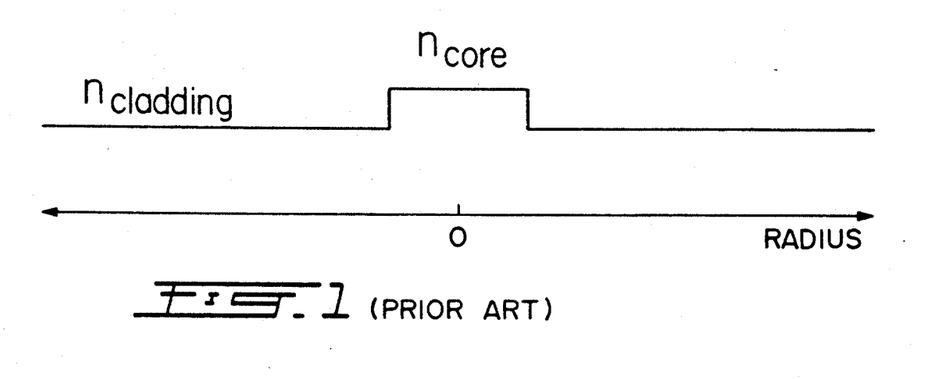
FIG. 1 schematically illustrates the refractive index profile of a conventional optical fiber waveguide.

FIG. 1 shows a standard step refractive index profile of an optical fiber waveguide. For optical wave guidance, the refractive index of the core, $n_{core}$, must be higher than that of the cladding, $n_{cladding}$. The refractive index difference, $(n_{core} - n_{cladding})/n_{core}$, is usually about 0.4% for a single mode optical fiber for telecommunication applications.

Figure 2:
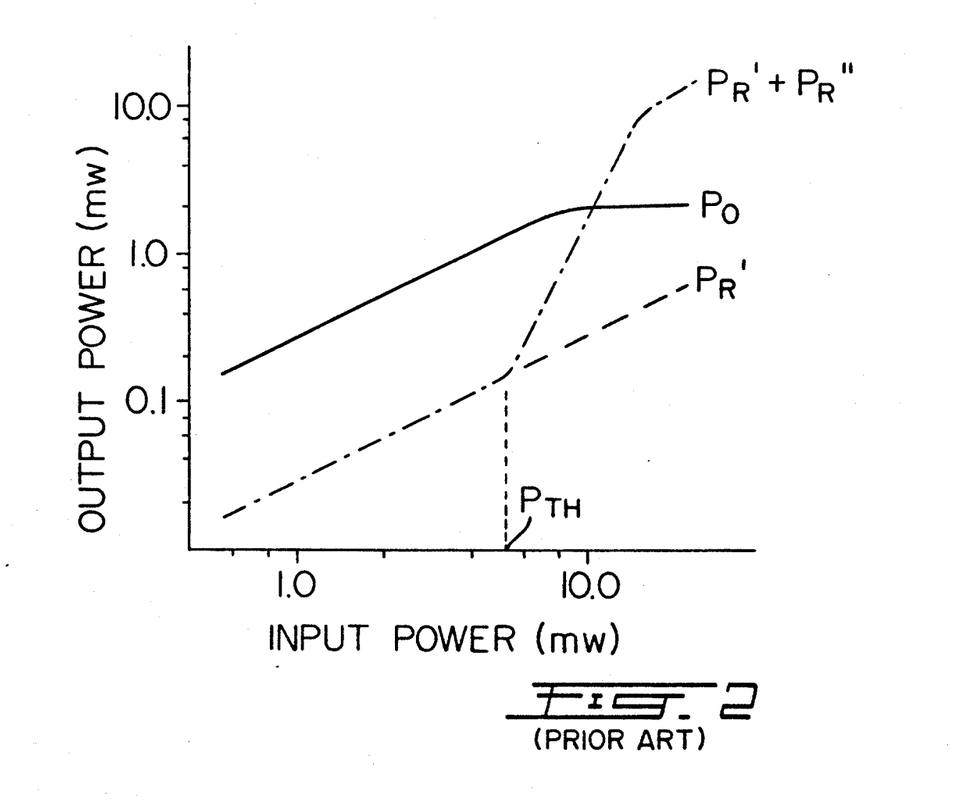
FIG. 2 is a diagram illustrating the SBBS phenomenon in a conventional single-mode optical fiber.

As shown in FIG. 2, when the input optical power launched into a single mode optical fiber exceeds the threshold level, $P_{TH}$, of SBBS, in addition to the Fresnel reflection, $P_R'$, at the air-fiber interface, a fraction, $P_R''$, is reflected to the input end due to the SBBS. The output power $P_o$ cannot be increased above a limit.

According to the invention, the acoustic profile is used to adjust the $P_{TH}$ and thereby control the amount of reflected power $P_R''$ due to SBBS. For example, a higher $P_{TH}$ will result in a smaller $P_R''$, and a higher output power $P_o$ will appear at the fiber output end.

Figure 3A:
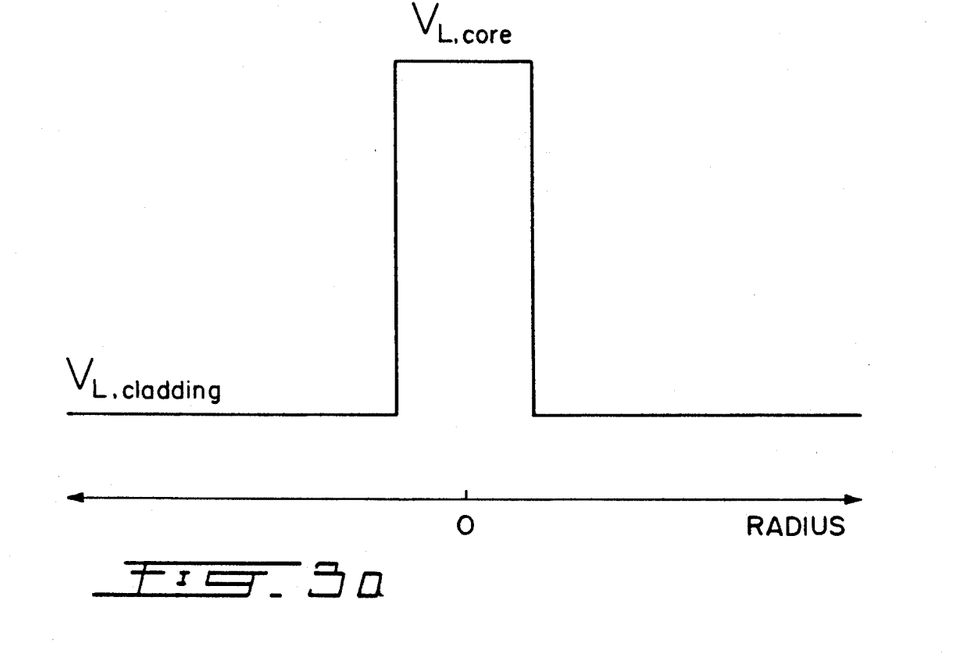
FIGS. 3a and 3b schematically illustrate the longitudinal and shear acoustic wave velocity profiles, respectively, of a high $_{TH}$ optical fiber according to the invention.
Figure 3B:
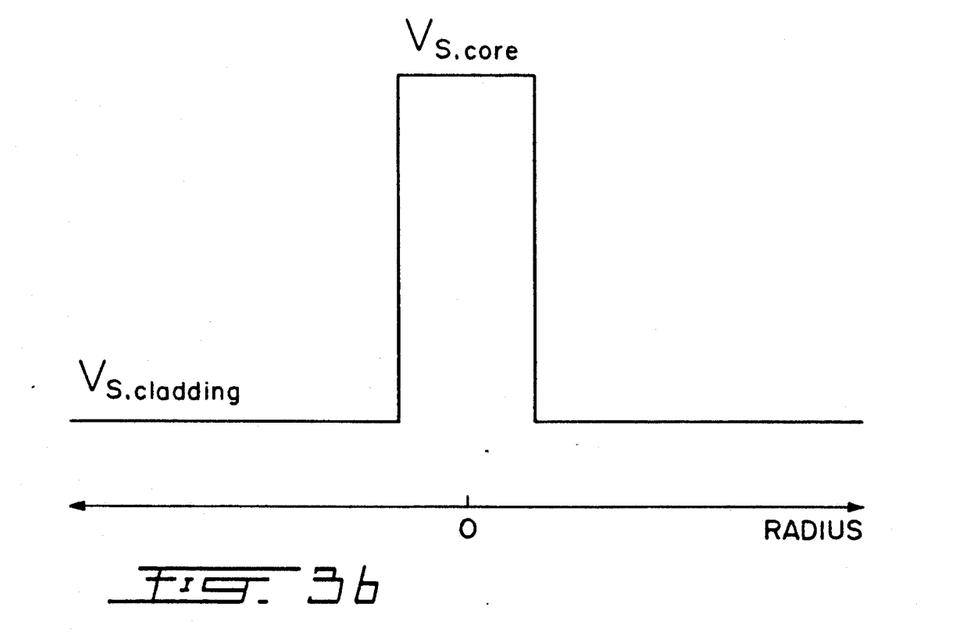
Figure 4A:
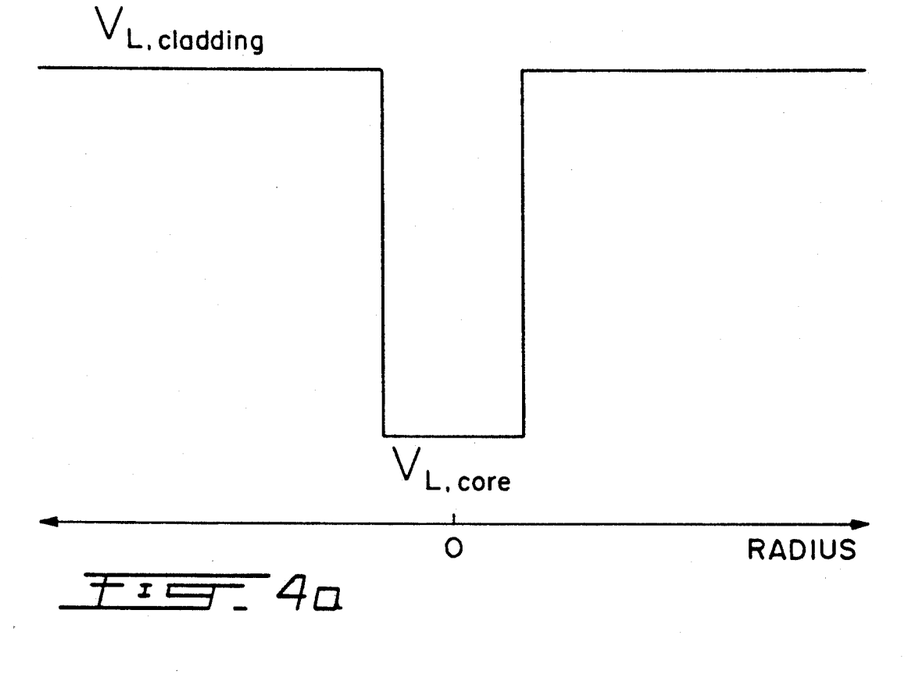
FIGS. 4a and 4b schematically illustrate the longitudinal and shear acoustic wave velocity profiles, respectively, of a low $P_{TH}$ optical fiber according to the invention.
Figure 4B:
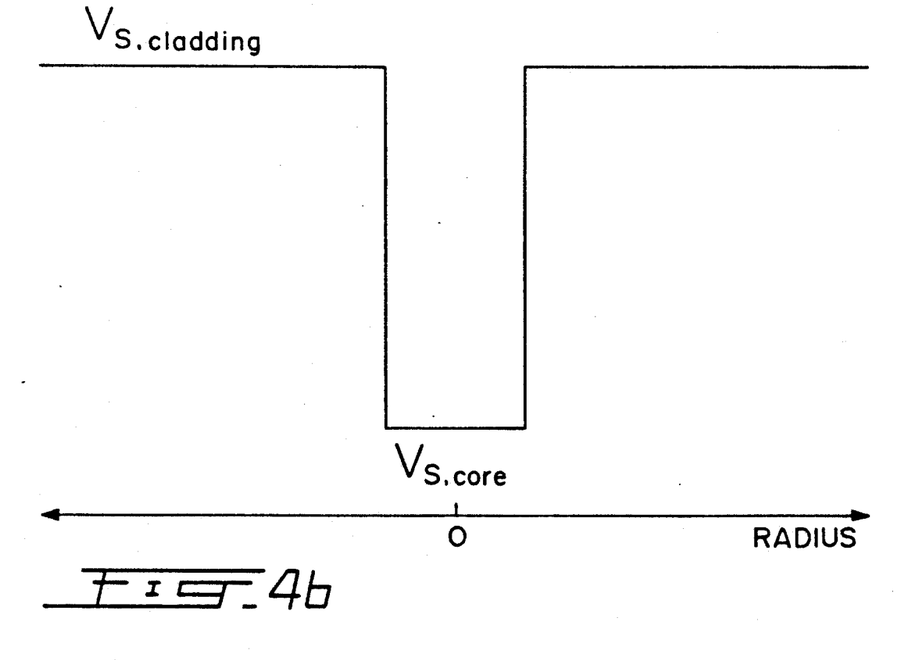
Figure 5A:
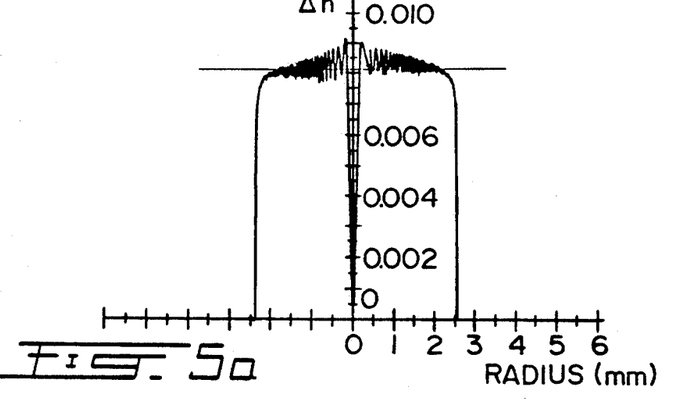
FIGS. 5a, 5b and 5c are diagrams showing respectively the refractive index ($\Delta n$) profile, the leaky surface acoustic wave velocity ($V_{LSAW}$) profile and the leaky surface-skimming compressional wave velocity ($V_{LSSCW}$) profile as measured for an optical fiber preform with an 8.6% $GeO_2$ + 3.5% $P_2O_5$ doped silica core and pure silica cladding.
Figure 5B:
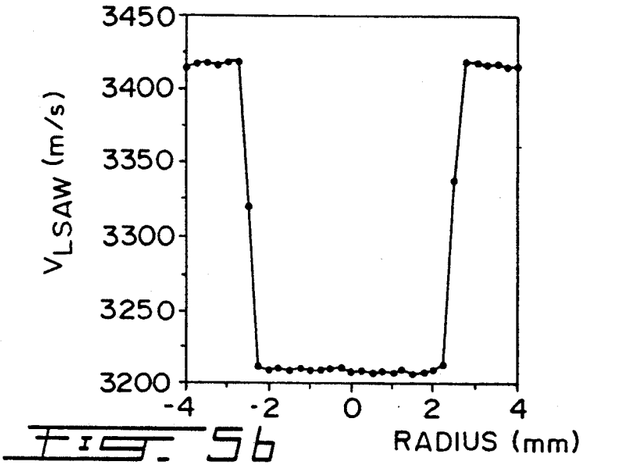
Figure 5C:
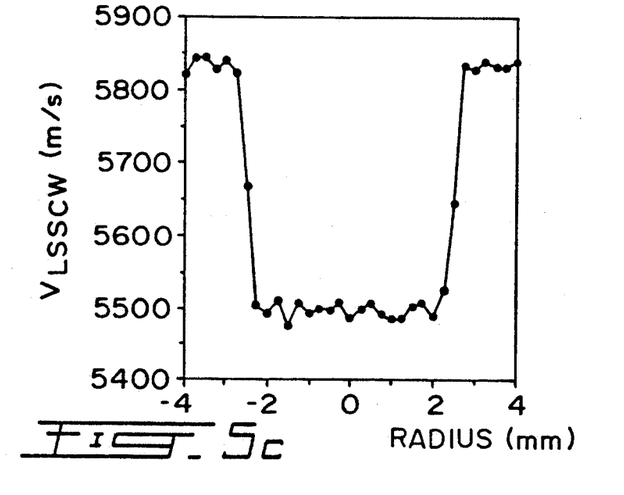
Figure 6A:
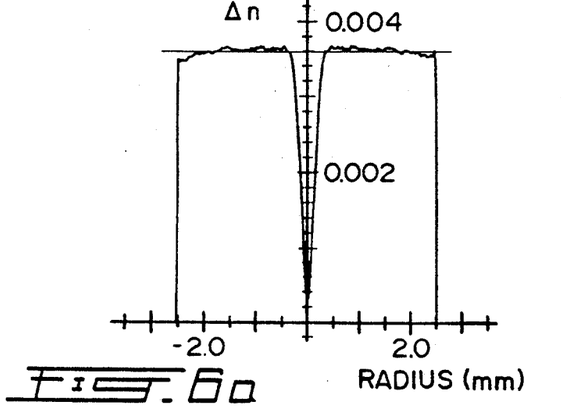
FIGS. 6a, 6b and 6c are diagrams showing respectively the measured $\Delta n$, $V_{LSAW}$ and $V_{LSSCW}$ profiles for an optical fiber preform with a 12.4% $P_2O_5$ doped silica core and pure silica cladding.
Figure 6B:
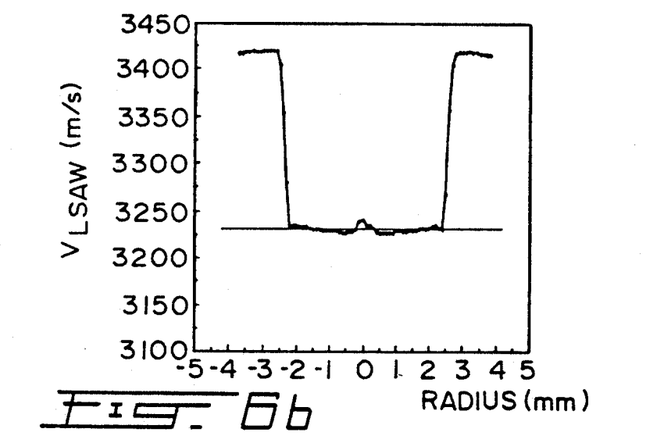
Figure 6C:
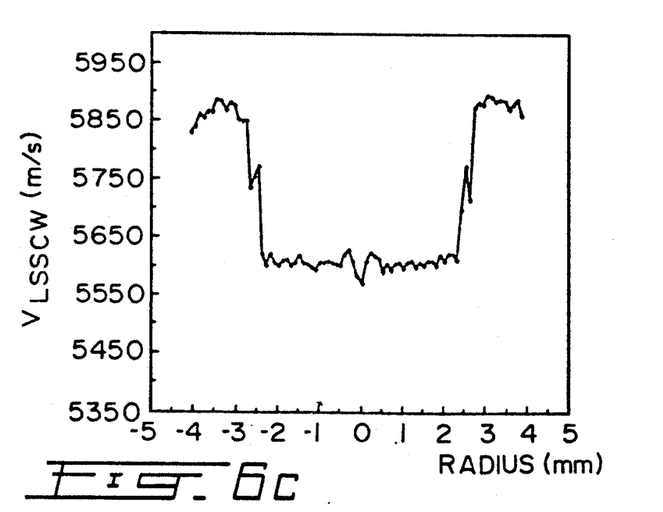
Figure 7A:
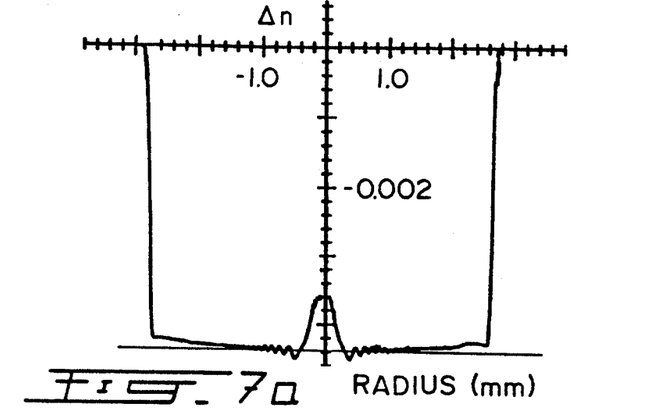
FIGS. 7a, 7b and 7c are diagrams showing respectively the measured $\Delta n$, $V_{LSAW}$ and $V_{LSSCW}$ profiles for a preform sample with a 0.95% F doped silica core and pure silica cladding.
Figure 7B:
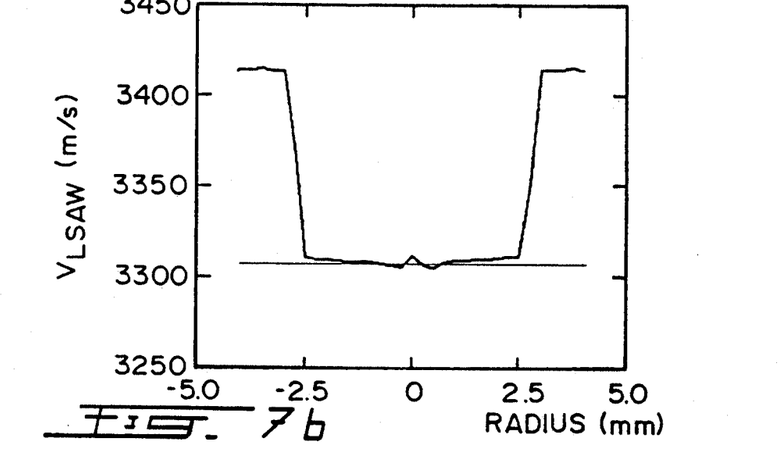
Figure 7C:
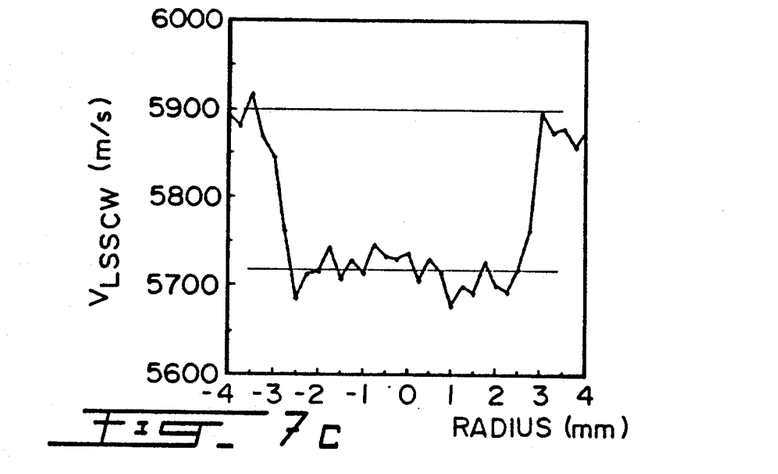
Figure 8A:
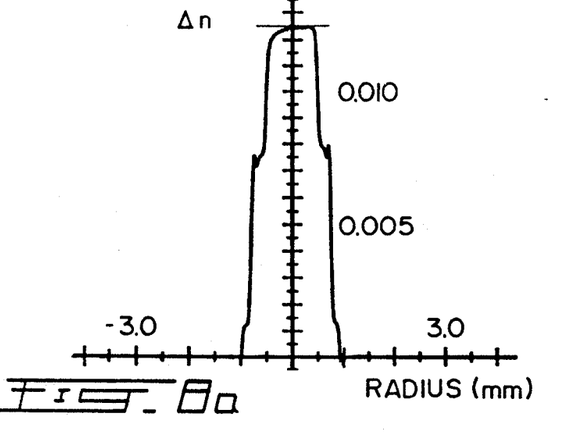
FIGS. 8a, 8b and 8c are diagrams showing respectively the measured $\Delta n$, $V_{LSAW}$ and $V_{LSSCW}$ profiles for an optical fiber preform with a 3.5% $TiO_2$ doped silica core and pure silica cladding.
Figure 8B:
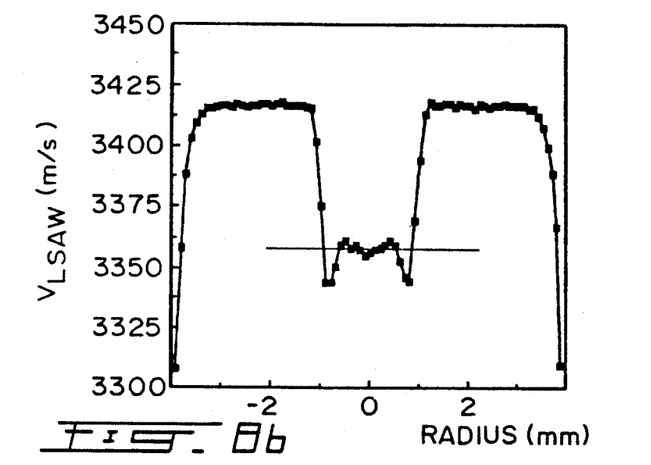
Figure 8C:
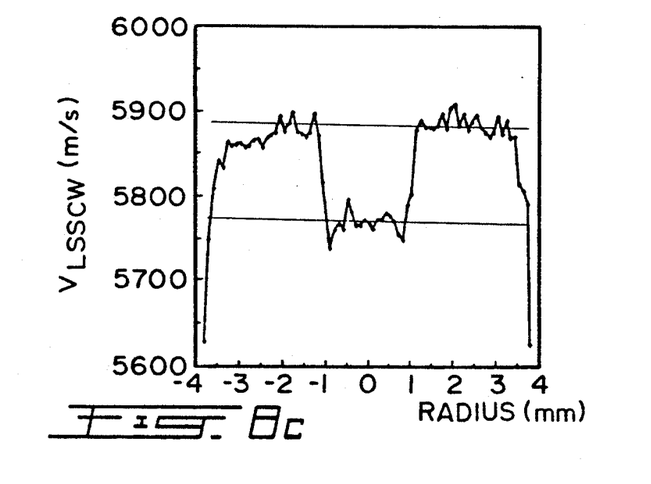
Figure 9A:
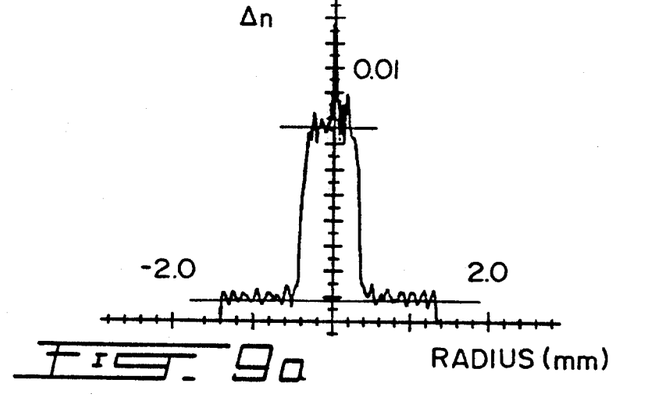
FIGS. 9a, 9b and 9c are diagrams showing respectively the measured, $\Delta n$, $V_{LSAW}$ and $V_{LSSCW}$ profiles for an optical fiber preform with a 7.4% $Al_2O_3$ + 3.5% $P_2O_5$ doped silica core and pure silica cladding.
Figure 9B:
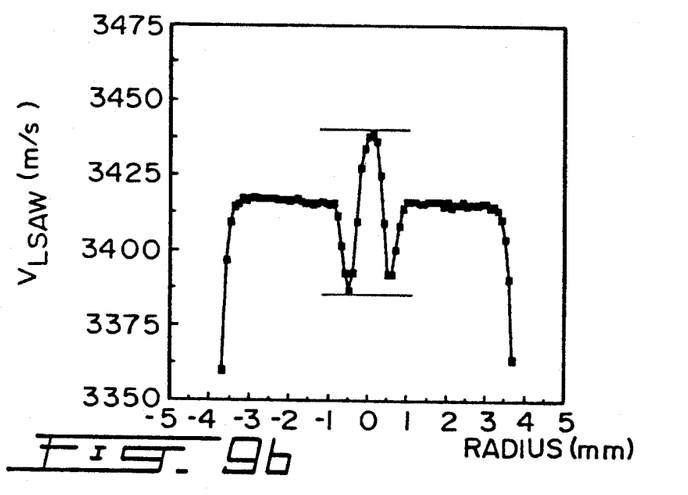
Figure 9C:
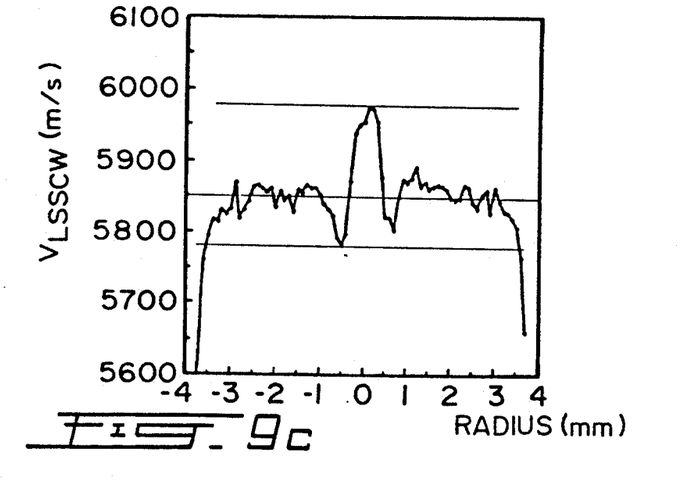

FIGS. 3a, 3b, 4a and 4b schematically illustrate the principle of the invention. If the acoustic wave velocity of the core is higher than that of the cladding as shown in FIGS. 3a and 3b, the acoustic wave energy will leak from the fiber core to the fiber cladding. This means that the level of the SBBS in the optical fiber in which the acoustic waves are not guided in the core will be low, and thus the $P_{TH}$ will be high. If the acoustic wave velocity of the core is less than that of the cladding as shown in FIGS. 4a and 4b, the acoustic waves are well guided in the fiber core. The level of the SBBS will thus be high and the $P_{TH}$ low.

As illustrated, the acoustic wave velocity difference between the core and cladding regions is typically larger than 10%. In other words, in the case of the high $P_{TH}$ optical fiber whose acoustic profile is shown in FIGS. 3a and 3b, the longitudinal and shear acoustic wave velocities of the core and cladding regions are such that $V_{L,core} > 1.1\ V_{L,cladding}$ and $V_{S,core}$ $V_{S,cladding}$. On the other hand, in the case of the low $P_{TH}$ optical fiber whose acoustic profile is shown in FIGS. 4a and 4b, the longitudinal and shear acoustic wave velocities of the core and cladding regions are such that $V_{L,core} < 0.9\ V_{L,cladding}$ and $V_{S,core} < 0.9\ V_{S,cladding}$.

As previously indicated, Applicant has found that dopants such as $GeO_2$, F, $B_2O_3$, $P_2O_5$ and $TiO_2$ in silica decrease the acoustic velocity and $Al_2O_3$ increases the acoustic velocity. When designing a desired acoustic profile, the requirement of optical guidance (i.e. $n_{core} > n_{cladding}$) must be taken into account. This means that the refractive index change due to a dopant or dopants added to the core must be an increase, and in the meantime the dopant or dopants must also produce the desired acoustic profile. For instance, to produce a high $P_{TH}$ optical fiber, one can use pure silica as the cladding and dope $Al_2O_3$ into a silica core to increase the refractive index and also achieve higher acoustic wave velocity and higher material loss in the core region. A preferred $Al_2O_3$ doped silica core contains $Al_2O_3$ in a concentration ranging from about 6 to about 8% by weight. It is also possible to use a core material consisting of pure silica and a cladding material consisting of doped silica containing at least one dopant which decreases the refractive index as well as the acoustic wave velocity of the cladding region. Examples of such dopants are F and $B_2O_3$. A preferred F doped silica cladding contains F in a concentration ranging from about 0.8 to about 1.1% by weight. A $B_2O_3$ doped silica cladding preferably contains from about 2 to about 15% by weight of $B_2O_3$.

In order to produce a low $P_{TH}$ optical fiber, one may use a pure silica cladding and a doped silica core containing at least one dopant which increases the refractive index of the core region, but decreases the acoustic wave velocity thereof. Examples of such dopants are $GeO_2$, $P_2O_5$ and $TiO_2$. A preferred $GeO_2$ doped silica core contains $GeO_2$ in a concentration ranging from about 5 to about 30% by weight. A $P_2O_5$ doped silica core preferably contains from about 7 to about 14% by weight of $P_2O_5$. A $TiO_2$ doped silica core, on the other hand, preferably contains from about 3.5 to about 8% by weight of $TiO_2$. It is also possible to use a core material consisting of pure silica and a cladding material consisting of doped silica containing a mixture of dopants which decreases the refractive index of the cladding region, but increases the acoustic wave velocity thereof. For example, F+$Al_2O_3$ doped silica containing F and $Al_2O_3$ in proper relative concentrations can be used. A typical F+$Al_2O_3$ doped silica cladding contains about 1.1 weight % F and about 8 weight % $Al_2O_3$.

It is known that the acoustic profile across the fiber diameter governs the acoustic guidance properties. Since it is very difficult to obtain the radial distribution of longitudinal, $V_L$, or shear wave velocity, $V_S$, for small diameter cladded silica fibers, an alternative approach is to use the reflection scanning acoustic microscopy (SAM) and V(z) technique to provide the leaky surface acoustic wave velocity, $V_{LSAW}$, and the leaky surface-skimming compressional wave velocity, $V_{LSSCW}$, of optical fiber preforms. The principles of reflection SAM and V(z) curve measurements are described by J. Kushibiki and N. Chubachi in IEEE Trans. Sonics and Ultrason., Vol. SU-32, No. 2, pp. 189-212, 1985 and by A. Atalar in J. Appl. Phys., Vol. 49, No. 10, pp. 5130-5139, 1978, the teachings of which are incorporated herein by reference. V(z) is the voltage response of the piezoelectric transducer of the SAM lens while the lens is moving toward or away from the sample along the lens axis direction, z. Because the leaky surface acoustic wave and leaky surface-skimming compressional wave have predominantly shear and longitudinal wave components, respectively, their velocity variations due to different dopants or dopant concentrations can be approximately regarded as those of the shear wave velocity $V_S$ and the relations between $V_S$ and $V_{LSAW}$, and also between $V_L$ and $V_{LSSCW}$, are $V_S/V_{LSAW}=1.102$ and $V_{LSSCW}=1.014$.

FIGS. 5 to 9 show the measured profiles of (a) optical refractive index, $\Delta n$, (b) $V_{LSAW}$ and (c) $V_{LSSCW}$ for preforms with doped silica cores containing $GeO_2$, $P_2O_5$, F, $TiO_2$ and $Al_2O_3$ dopants, and pure silica claddings. The optical refractive index profiles were measured by a commercial refractive index measurement device providing a spatial resolution better than 10 µm. The refractive index $\Delta n$ was defined relative to that of pure silica. The abrupt refractive index variation at the preform center and the minor oscillations across the preform core are due to the fabrication process.

Examples of measured $V_{LSAW}$ and $V_{LSSCW}$ for preforms containing different dopants are shown in (b) and (c) respectively of FIGS. 5 to 9. by choosing the measured values at relative uniform concentration regions (some indicated by the horizontal lines in FIGS. 5 to 9) of many different preforms, one obtains FIGS. 11 and 12 which show the variation of $\Delta V_{LSAW}$ % and $\Delta V_{LSSCW}$%, respectively, versus dopant concentration W %. The slopes of the measured $\Delta V_{LSAW}$ % and $\Delta V_{LSSCW}$ % versus dopant concentration W % are summarized in the following Table, in which the slopes $\Delta n$ % versus dopant concentration are also listed for comparison purpose:

| DOPANT | $\Delta n$ %/W % | $\Delta V_{LSAW}$ %/W % | $\Delta V_{LSSCW}$ %/W % |
|---|---|---|---|
| $GeO_2$ | +0.05625 | −0.49 | −0.47 |
| $P_2O_5$ | +0.01974 | −0.41 | −0.31 |
| F | −0.313 | −3.1 | −3.6 |
| $TiO_2$ | +0.2347 | −0.45 | −0.59 |
| $Al_2O_3$ | +0.06285 | +0.21 | +0.42 |
| $B_2O_3$ | −0.03294 | −1.0 | — |

As it is apparent from the above Table, the variation of $V_{LSAW}$ and $V_{LSSCW}$ due to dopant concentration change is much larger than that of the refractive index. In other words, the acoustic velocity is more sensitive than the optical refractive index to the dopant concentration.

Figure 10A:
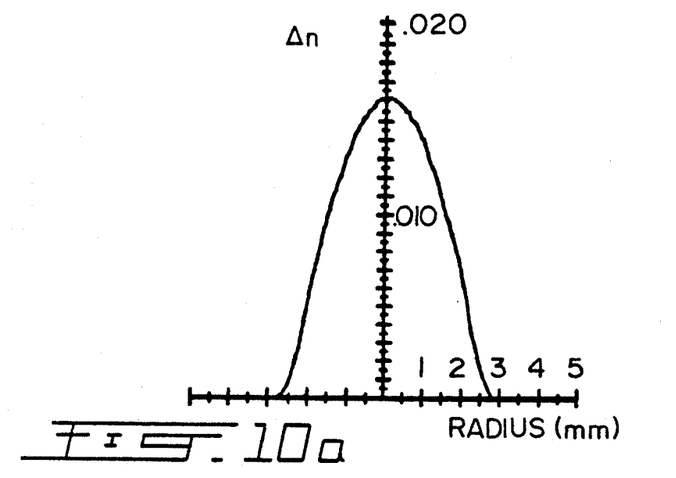
FIGS. 10a, 10b and 10c are diagrams showing the measured $\Delta n$, $V_{LSAW}$ and $V_{LSSCW}$ profiles for an optical fiber preform with a $GeO_2$ doped silica having a graded dopant concentration distribution and pure silica cladding.
Figure 10B:
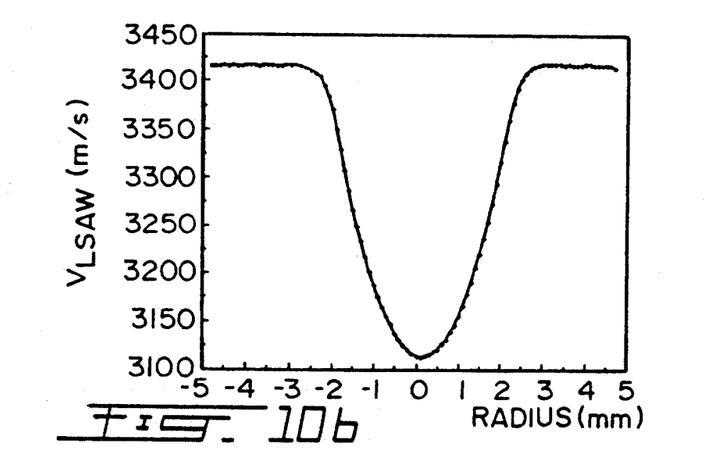
Figure 10C:
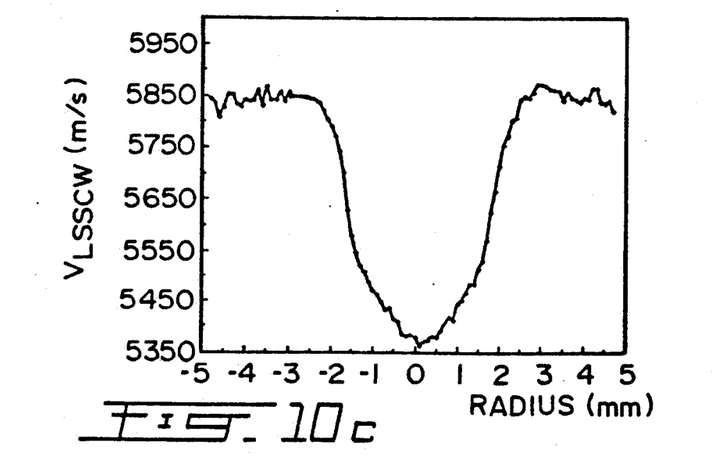
Figure 11A:
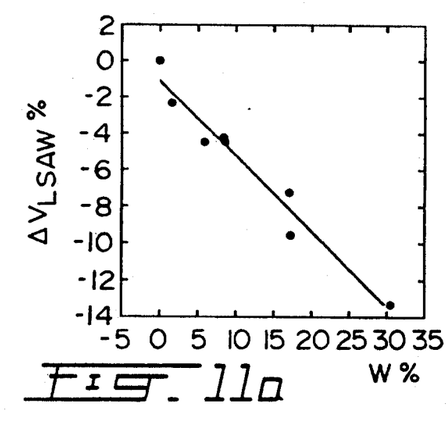
FIGS. 11a, 11b, 11c, 11d, 11e and 11f are diagrams showing the variation of the measured $\Delta V_{LSAW}$% (relative to $V_{LSAW}$ of pure silica) versus the concentration W % (weight percentage) of $GeO_2$, $P_2O_5$, F, $TiO_2$, $Al_2O_3$ and $B_2O_3$ dopants, respectively.
Figure 11B:
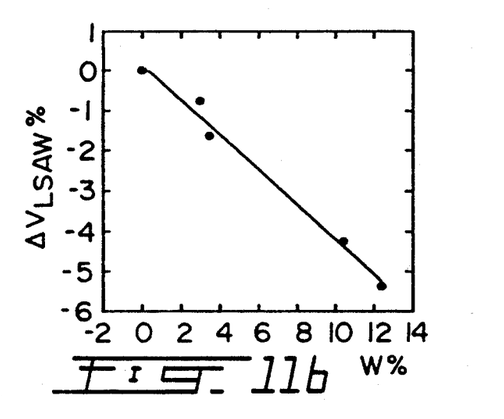
Figure 11C:
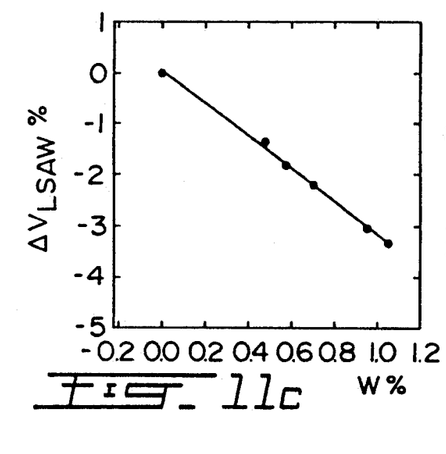
Figure 11D:
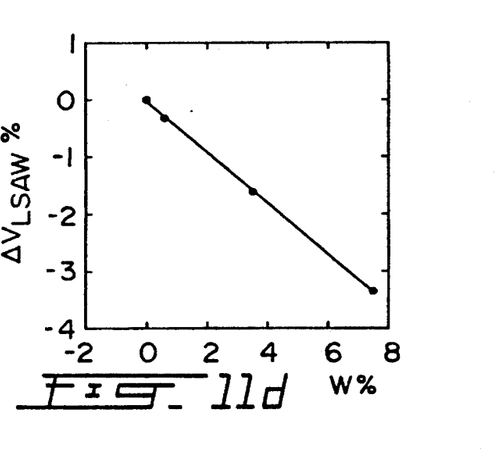
Figure 11E:
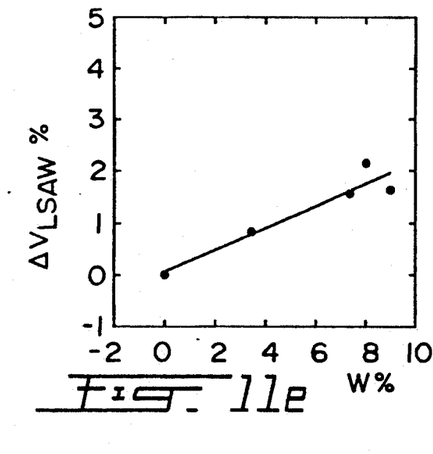
Figure 11F:
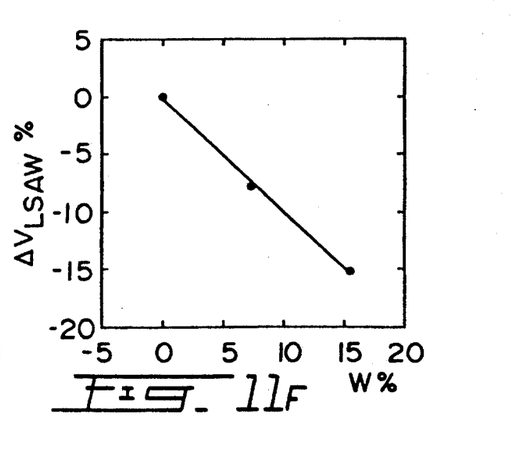
Figure 12A:
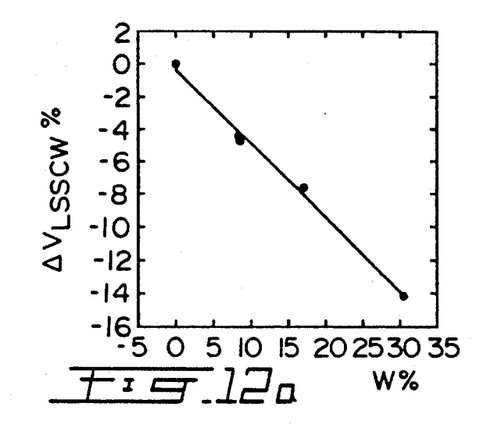
FIGS. 12a, 12b, 12c, 12d and 12e are diagrams showing the variation of the measured $\Delta V_{LSSCW}$% (relative to $V_{LSSCW}$ of pure silica) versus the concentration W % of $GeO_2$, $P_2O_5$, F, $TiO_2$ and $Al_2O_3$ dopants, respectively.
Figure 12B:
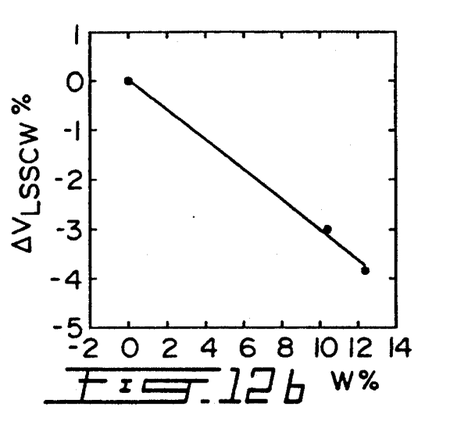
Figure 12C:
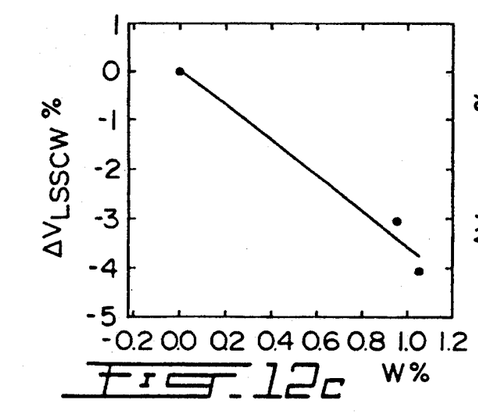
Figure 12D:
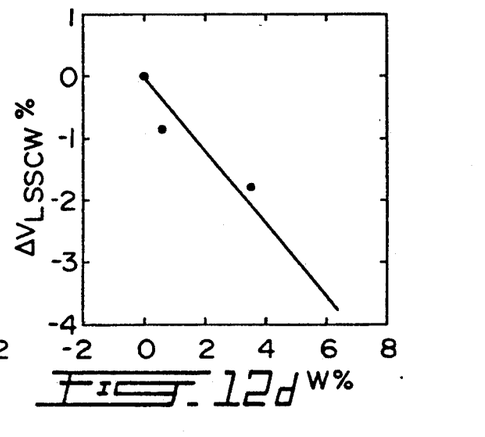
Figure 12E:
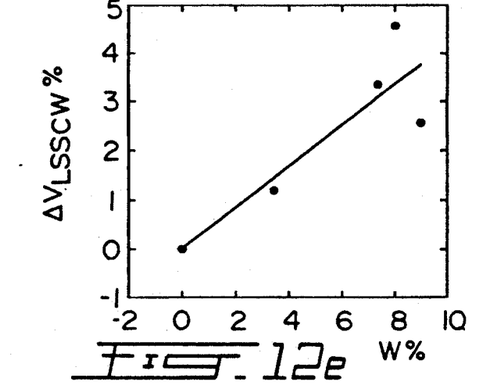

FIGS. 10a to 10c show that a $GeO_2$ doped silica fabricated by a vapor axial deposition method has both graded optical and acoustic profiles. FIGS. 5 to 10 also demonstrate that the fiber preforms having step and graded refractive index profiles also show step and graded acoustic wave velocity profiles, respectively.

FIGS. 11 and 12 clearly indicate that if a given amount of dopant is added to pure silica, then the acoustic velocity change will be known. Therefore, FIGS. 11 and 12 can be used to design a preferred acoustic wave velocity profile for an optical fiber in order to obtain a desired $P_{TH}$.

I claim:

1. An optical fiber having a stimulated backward Brillouin scattering threshold higher than 20 milliwatts, comprising a core region and a cladding region surrounding the core region, said core and cladding regions being composed respectively of core and cladding materials which are selected such that the core and cladding regions have respective refractive indices and respective longitudinal and shear acoustic wave velocities satisfying the following relations:

$n_{core} > n_{cladding}$ $V_{L,core} > 1.03\ V_{L,cladding}$ $V_{S,core} > 1.03\ V_{S,cladding}$ where $n_{core}$, $V_{L,core}$ and $V_{S,core}$ are respectively the refractive index longitudinal and shear acoustic wave velocities of the core region, and $N_{cladding}$, $V_{L,cladding}$ and $V_{S,cladding}$ are respectively the refractive index, longitudinal and shear acoustic wave of the cladding region, said core material having an acoustic material loss higher than 12 dB/cm.$GHz^2$.

2. An optical fiber as claimed in claim 1, wherein the core and cladding materials are selected such that the core and cladding regions have respective longitudinal and shear acoustic wave velocities satisfying the following relation:

$V_{L,core} > 1.1\ V_{L,cladding}$ $V_{S,core} > 1.1\ V_{S,cladding}$ where $V_{L,core}$, $V_{S,core}$, $V_{L,cladding}$ and $V_{S,cladding}$ are as defined in claim 1.

3. An optical fiber as claimed in claim 1, wherein the core and cladding materials are selected such that the core and cladding regions have respective material densities satisfying the following relations:

$$\rho_{core} \cdot V_{L,core} \simeq \rho_{cladding} \cdot V_{L,cladding}$$

$$\rho_{core} \cdot V_{S,core} \simeq \rho_{cladding} \cdot V_{S,cladding}$$

where $\rho_{core}$, and $\rho_{cladding}$ are respectively the material densities of the core and cladding regions, and $V_{L,core}$ $V_{L,cladding}$, $V_{S,core}$ and $V_{S,cladding}$ are as defined in claim 1.

4. An optical fiber as claimed in claim 1, wherein said core material is doped silica containing at least one dopant which increases the refractive index, longitudinal and shear acoustic wave velocities of the core region, and wherein said cladding material is pure silica.

5. An optical fiber as claimed in claim 4, wherein said dopant is $Al_2O_3$.

6. An optical fiber as claimed in claim 5, wherein said core material is $Al_2O_3$ doped silica containing $Al_2O_3$ in a concentration ranging from about 6 to about 8% by weight.

7. An optical fiber as claimed in claim 1, wherein said core material is pure silica and wherein said cladding material is doped silica containing at least one dopant which lowers the refractive index, longitudinal and shear acoustic wave velocities of the cladding region.

8. An optical fiber as claimed in claim 7, wherein said dopant is F or $B_2O_3$.

9. An optical fiber as claimed in claim 8, wherein said cladding material is F doped silica containing F in a concentration ranging from about 0.8 to about 1.1% by weight.

10. An optical fiber as claimed in claim 8, wherein said cladding material is $B_2O_3$ doped silica containing $B_2O_3$ in a concentration ranging from about 2 to about 15% by weight.

11. An optical fiber having a stimulated backward Brillouin scattering threshold lower than 1 milliwatt, comprising a core region and a cladding region surrounding the core region, said core and cladding regions being composed respectively of core and cladding materials which are selected such that the core and cladding regions have respective refractive indices and respective longitudinal and shear acoustic wave velocities satisfying the following relations:

$$n_{core} > n_{cladding}$$

$$V_{L,core} < 0.97\ V_{L,cladding}$$

$$V_{S,core} < 0.97\ V_{S,cladding}$$

where $n_{core}$, $V_{L,core}$ and $V_{S,core}$ are respectively the refractive index, longitudinal and shear acoustic wave velocities of the core region, and $n_{cladding}$, $V_{L,cladding}$ and $V_{S,cladding}$ are respectively the refractive index, longitudinal and shear acoustic wave of the cladding region, said core material having an acoustic material loss less than 12 dB/cm.$GHz^2$.

12. An optical fiber as claimed in claim 11, wherein the core and cladding materials are selected such that the core and cladding regions have respective longitudinal and shear acoustic wave velocities satisfying the following relations $$V_{L,core} < 0.9\ V_{L,cladding}$$

$$V_{S,core} < 0.9\ V_{S,cladding}$$

where $V_{L,core}$, $V_{S,core}$, $V_{L,cladding}$ and $V_{S,cladding}$ are as defined in claim 1.

13. An optical fiber as claimed in claim 11, wherein said core material is doped silica containing at least one dopant which increases the refractive index of the core region and decreases the longitudinal and shear acoustic wave velocities thereof, and wherein the cladding material is pure silica.

14. An optical fiber as claimed in claim 13, wherein said dopant is selected from the group consisting of $GeO_2$, $P_2O_5$ and $TiO_2$, and mixtures thereof.

15. An optical fiber as claimed in claim 14, wherein said core material is $GeO_2$ doped silica containing $GeO_2$ in a concentration ranging from about 5 to about 30% by weight.

16. An optical fiber as claimed in claim 14, wherein said core material is $P_2O_5$ doped silica containing $P_2O_5$ in a concentration ranging from about 7 to about 14% by weight.

17. An optical fiber as claimed in claim 14, wherein said core material is $TiO_2$ doped silica containing $TiO_2$ in a concentration ranging from about 3.5 to about 8% by weight.

18. An optical fiber as claimed in claim 11, wherein said core material is pure silica and wherein said cladding material is doped silica containing a mixture of dopants which decreases the refractive index of the cladding region and increases the longitudinal and shear acoustic wave velocities thereof.

19. An optical fiber as claimed in claim 18, wherein said cladding material is F+$Al_2O_3$ doped silica containing F and $Al_2O_3$ in relative concentration such as to decrease the refractive index of the cladding region and increase the longitudinal and shear acoustic wave velocities thereof.

20. An optical fiber as claimed in claim 19, wherein said cladding material is a F+$Al_2O_3$ doped silica containing about 1.1 weight % F and about 8 weight % $Al_2O_3$.

* * * * *